United States Patent [19]
Schmidt

[11] Patent Number: 5,603,671
[45] Date of Patent: Feb. 18, 1997

[54] THREE PRIME MOVER BUS TRANSMISSION

[75] Inventor: Michael R. Schmidt, Carmel, Ind.

[73] Assignee: General Motors Corporation, Detroit, Mich.

[21] Appl. No.: 512,498

[22] Filed: Aug. 8, 1995

[51] Int. Cl.$^6$ .................................................. F16H 3/72
[52] U.S. Cl. .............................. 475/5; 475/151; 475/330; 180/65.4; 180/69.6
[58] Field of Search ..................... 475/1, 5, 151, 475/330; 180/65.2, 65.3, 65.4, 65.7, 69.6

[56] References Cited

U.S. PATENT DOCUMENTS

| | | | |
|---|---|---|---|
| 3,861,484 | 1/1975 | Joslin | 475/5 |
| 4,233,858 | 11/1980 | Rowlett | 477/3 |
| 4,579,019 | 4/1986 | Gabriele | 475/5 |
| 4,588,040 | 5/1986 | Albright, Jr. et al. | 180/65.4 |
| 5,508,574 | 4/1996 | Vlock | 475/149 |
| 5,509,491 | 4/1996 | Hall, III | 475/5 |

Primary Examiner—Charles A. Marmor
Assistant Examiner—Sherry Lynn Estremsky
Attorney, Agent, or Firm—Donald F. Scherer

[57] ABSTRACT

A regenerative transmission that utilizes three prime mover input modes. The transmission has at least one planetary gear set, and each planetary gear set has an inner gear member, an outer gear member and a plurality of planet gear members meshingly engaging the inner and outer gear members. The planet gear members are operatively mounted on a carrier in each planetary gear set. The outer gear member in each planetary gear set is grounded, and the inner gear member in each planetary gear set is connected to a respective motor/generator. An output shaft is provided and means are provided selectively to connect the carrier in each planetary gear set to the output shaft. A plurality of torque transfer devices selectively connect the prime mover input modes to the output shaft.

26 Claims, 1 Drawing Sheet

THREE PRIME MOVER BUS TRANSMISSION

TECHNICAL FIELD

The present invention relates generally to vehicular transmission systems. More particularly, the present invention relates to a vehicular transmission that is capable of receiving input power from multiple sources. Specifically, the present invention relates to a regenerative transmission that is capable of operating: with an internal combustion engine as the prime mover; with an internal combustion engine combined with a mechanical energy storage device, such as a flywheel, as the prime mover; or, with a source of electrical energy as the prime mover.

BACKGROUND OF THE INVENTION

Regenerative type transmissions are generally well known in the art. U.S. Pat. No. 4,126,200 to Miller et al, for example, teaches a two-mode, input-slip, integrated hydrostatic unit for use as a vehicle drive system. Miller et al discloses a drive system for vehicles powered by heat engines. More particularly, the Miller et al arrangement constitutes a drive and transmission system providing kinetic energy storage for use in a vehicle powered by a heat engine such as an internal combustion engine. Specifically, Miller et al teaches a vehicular drive system that includes a combination of a heat engine, flywheel, an electric motor/generator and a differential. The heat engine is directly coupled to a flywheel and to the first shaft of a differential. The motor/generator is coupled to the second shaft of the differential, and the third shaft of the differential is connected to a multi-speed gearbox. The gearbox output is connected to the drive wheels of the vehicle. By controlling the torque produced by the electric motor/generator and the fuel supply to the heat engine, the flywheel can be made to decelerate during vehicle acceleration and to recover energy during vehicle deceleration. During operation of the vehicle, the heat engine is directly coupled to the flywheel at a fixed gear ratio.

In the first operational mode of the Miller et al drive system, the flywheel and the source of rotational energy are coupled to the first drive terminal and the second drive terminal is coupled to the drive wheels of the vehicle. In the second mode of operation, the flywheel is coupled to the second drive terminal, and the rotational energy source and the first drive terminal are coupled to the drive wheels. Finally, the control apparatus for governing the operation for the variable transmission apparatus and the source of the rotational energy is capable of independent control of the speed of the flywheel and the source of the rotational energy.

The Miller et al transmission system featured several new innovations. For example, the source of rotational energy and the flywheel were not directly coupled at a fixed gear ratio in all of the modes. Thus, the rotational velocity of the flywheel could be a varying multiple of the engine speed during the starting mode of the flywheel energization, as well as operation in the "low", "second" and "hi" (or highway) modes of operation, and a desired fixed multiple thereof during directly coupled operation of the flywheel and engine in the first mode of operation. As a result, Miller et al employed only a single variable transmission operable in a number of differing modes to govern: the speed relationship between the flywheel and the rotational energy source; and, the speed relationship between the flywheel and rotational energy source on one hand and the vehicle wheels on the other. This arrangement enabled independent control of the rotational speed and torque of the flywheel and rotational energy source so that the operation of the flywheel and rotational energy source could be governed in a manner that produces improved efficiency and fuel economy under differing driving conditions.

However, the Miller et al drive system has several drawbacks. These drawbacks include the use of a hydrostatic unit which is bulky and cumbersome when used in conjunction with a transmission system. Moreover, the Miller et al drive system was still not as efficient as it could be. These drawbacks were addressed in U.S. Pat. No. 5,024,633. Generally, the '633 patent discloses an improved power transmission wherein an engine is selectively coupled to an output drive member through a gear and hydrostatic transmission arrangement so that an energy storage device is selectively coupled with the engine gearing arrangement and hydrostatic transmission to selectively store energy from the system, and then deliver energy back to the system. This arrangement allows the size of the hydrostatic units to be reduced in size, while maintaining the efficiency of the transmission.

Unfortunately, the use of hydrostatic arrangements in transmission systems creates numerous design problems. For example, hydrostatic pumps and motors do not lend themselves to a concentric transmission design. Further, hydrostatic units cannot accept another shaft operating concentrically through their pump and motor shafts. As a result, the hydrostatic pump and motor must be set laterally to the side along, at best, a parallel centerline with external gearing so as to transfer the power provided by the hydrostatic arrangement to the centerline of the transmission, thus making the transmission bulkier than desired. In addition, hydrostatic units that operate in excess of 5,000 PSI tend to be very noisy.

Accordingly, there is a need in the art for a regenerative transmission system that is efficient in operation and can receive multiple power inputs from highly differing sources.

SUMMARY OF THE INVENTION

It is, therefore, a primary object of the present invention to provide a novel regenerative transmission system that will accept multiple power inputs.

It is another object of the present invention to provide a regenerative transmission system, as above, that will accept power input from an internal combustion engine, an internal combustion engine used in conjunction with a flywheel, and an electrical power source such as an overhead wire, an underground rail, or a series of batteries.

It is a further object of the present invention to provide a regenerative transmission system, as above, that is capable of receiving input from several power sources, and also capable of interchanging these input power sources during the operation of the transmission.

It is still another object of the present invention to provide a regenerative transmission system, as above, wherein the generator and motor can switch functions depending on the speed requirements of the transmission.

It is yet another object of the present invention to provide a regenerative transmission system, as above, that utilizes a flywheel as the mechanical energy storing device—shifting between successive operating ranges being synchronous when the flywheel is operatively connected to the transmission.

These and other objects of the invention, as well as the advantages thereof over existing and prior art forms, which will be apparent in view of the following detailed specification, are accomplished by means hereinafter described and claimed.

In general, a regenerative transmission embodying the concepts of the present invention utilizes three prime mover input modes. The transmission has at least one planetary gear set, and each planetary gear set has an inner gear member, an outer gear member and a plurality of planet gear members meshingly engaging the inner and outer gear members. The planet gear members are operatively mounted on a carrier in each planetary gear set.

The outer gear member in each planetary gear set is grounded, and the inner gear member in each planetary gear set is connected to a respective motor/generator. An output shaft is provided and means are provided selectively to connect the carrier in each planetary gear set to the output shaft.

A plurality of torque transfer devices selectively connect the prime mover input modes to the output shaft.

To acquaint persons skilled in the arts most closely related to the present invention, one preferred embodiment of a regenerative transmission that illustrates a best mode now contemplated for putting the invention into practice is described herein by, and with reference to, the annexed drawings that form a part of the specification. The exemplary reversing assembly is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
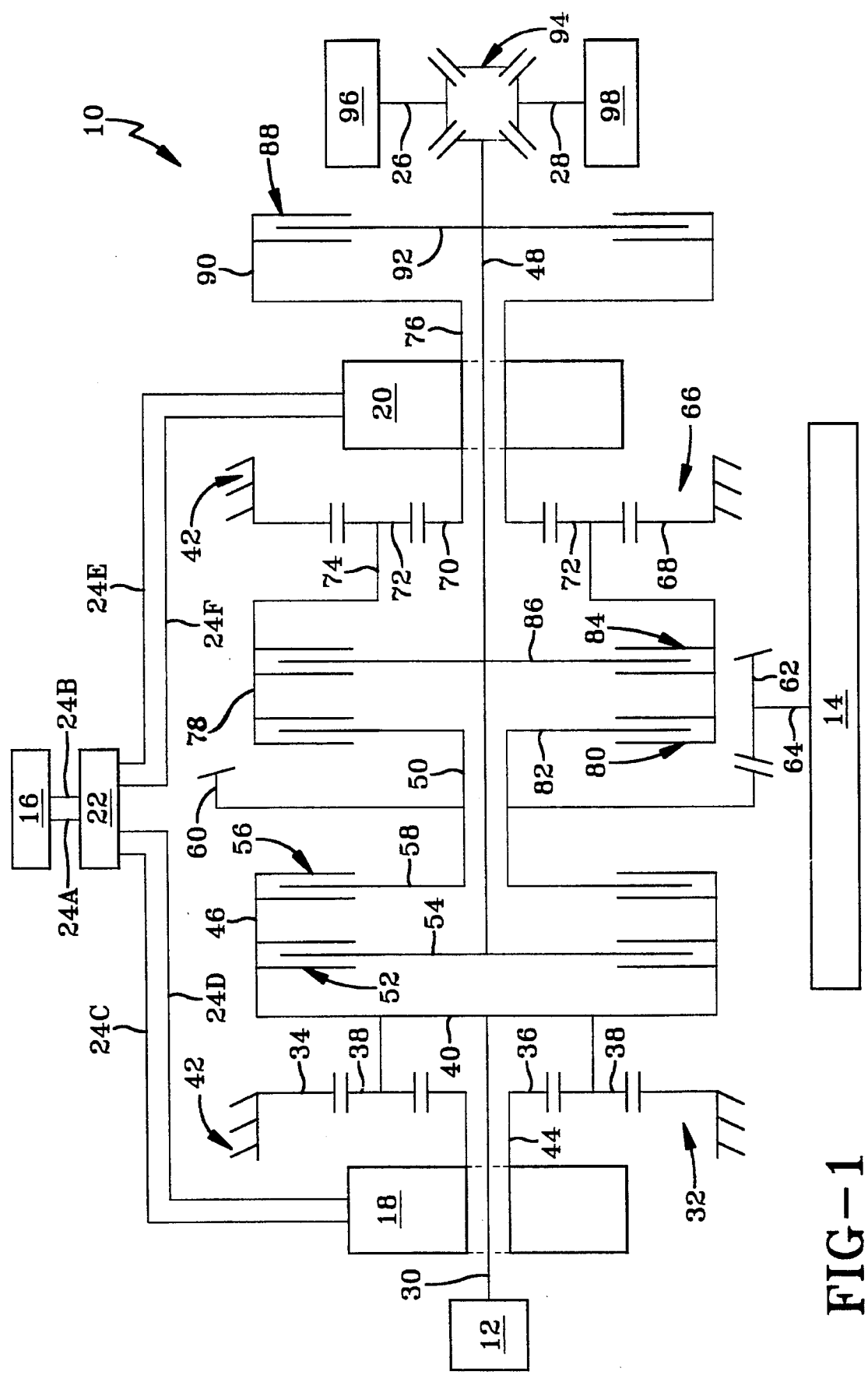
FIG. 1 is a schematic drawing depicting a transmission embodying the concepts of the present invention.

One representative form of a regenerative transmission embodying the concepts of the present invention is designated generally by the numeral 10 on the accompanying drawings. With reference, then, to FIG. 1, and as will be hereinafter more fully explained, the representative transmission 10 is particularly adapted for use with a vehicle (not shown) such as a bus that is driven by an operator. As such, the regenerative transmission 10 is capable of receiving energy for operation from a plurality of power sources such as: an internal combustion engine 12; an internal combustion engine 12 in combination with a mechanical energy storage device, such as a flywheel 14; and/or a source of electrical energy 16. The source of electrical energy 16 may be an on-board electrical energy storage device, such as one or more batteries. However, other electrical energy storage devices that have the ability to store electric power and dispense electric power may be used in place of the batteries without altering the concepts of the present invention. The source of electrical energy 16 may also be an external power source, such as an overhead wire or an underground rail (both of which are well known to the art, but neither of which are depicted).

The regenerative transmission 10 also utilizes first and second motor/generators 18 and 20, respectively. The first motor/generator 18 is capable of transforming electrical power into mechanical power and transforming mechanical power into electrical power. The motor/generators 18 and 20 may be connected to each other as well as to any source of electrical energy 16 through an electrical control unit (ECU) 22. As depicted, electrical conductors 24A and 24B connect the source of electrical energy 16 to the ECU 22; electrical conductors 24C and 24D connect the ECU 22 to the first motor/generator 18; and, electrical conductors 24E and 24F connect the ECU 22 to the second motor/generator 20. The transmission 10 can also receive feed-back power from the axles 26 and 28 of the vehicle when the vehicle is decelerating.

As previewed in the previous paragraph, and as may appear in the detailed description which follows, a particular structural member, component or arrangement may be employed at more than one location. When referring generally to that type of structural member, component or arrangement a common numerical designation shall be employed. However, when one of the structural members, components or arrangements so identified is to be individually identified it shall be referenced by virtue of a letter suffix employed in combination with the numerical designation employed for general identification of that structural member, component or arrangement. Thus, there are a plurality of electrical conductors which are generally identified by the numeral 24, but the specific, individual electrical conductors are, therefore, identified as 24A, 24B, 24C, etc. in the specification and on the drawings. This same suffix convention shall be employed throughout the specification.

In conjunction with the exemplary embodiment of the regenerative transmission 10, the internal combustion engine 12 may be a fossil fuel engine, and power from the engine 12 is introduced into the transmission 10 through an input shaft 30 that is connected to a first planetary gear set 32. Before explaining how the input shaft 30 is connected to the first planetary gear set 32, it should be understood that the first planetary gear set 32 has an outer gear member 34, generally designated as the ring gear, which circumscribes an inner gear member 36, generally designated as the sun gear. A plurality of third, or planet, gear members 38 are rotatably mounted on a first carrier 40 such that each planet gear 38 meshingly engages both the outer gear member 34 and the inner gear member 36.

In the preferred embodiment of the hybrid transmission 10, the input shaft 30 is connected to the carder 40, and the outer gear member 34 is permanently connected to ground 42. With the outer gear member 34 grounded, power from the engine 12 rotates the carrier 40 to transmit power through the planet gear members 38 against the grounded outer gear member 34 to rotate the inner gear member 36. The inner gear member 36 is connected—through a first sun sleeve shaft 44 which circumscribes the input shaft 30—to the first motor/generator 18 which then operates as a generator. That is, when the first motor/generator 18 acts as a generator, the rotation of the inner gear member 36, as by the engine 12, will power the generator. Conversely, when the first motor/generator 18 is acting as a motor, power will be transmitted from the first motor/generator through the first, sun, sleeve shaft 44 to rotate the inner gear member 38. With the outer gear member 34 grounded, rotation of the inner gear member 38 effects rotation of the planet gear members 38, thereby effecting rotation of the carrier 40.

An annular, carder extension sleeve 46 is secured to the first carrier 0 for selective connection to an output shaft 48 and selective connection to an annular regenerative sleeve shaft 50 that circumscribes the output shaft 48. The selective connection between the first carrier extension sleeve 46 and the output shaft 48 is accomplished by a first torque transfer device 52 which operates as a clutch. Specifically, the first torque transfer device 52 connects the first carrier extension sleeve 46 to a first transfer arm 54 that projects radially outwardly from the output shaft 48.

The selective connection between the first carder extension sleeve 46 and the annular regenerative sleeve shaft 50 is accomplished by a second torque transfer device 56 which also operates as a clutch. Specifically, the second torque transfer device connects the first carrier extension sleeve 46 to a second transfer arm 56 that projects radially outwardly from the second annular sleeve shaft 50.

A first bevel gear member 60 extends radially outwardly from the annular regenerative sleeve shaft 50 meshingly to engage a second bevel gear member 62 mounted on a shaft 64 that is secured to the mechanical energy storage device 14—viz.: a flywheel.

The regenerative transmission 10 also utilizes a second planetary gear set 66. It should be understood that the second planetary gear set 66 also has an outer gear member 68, generally designated as the ring gear, which circumscribes an inner gear member 70, generally designated as the sun gear. A plurality of third, or planet, gear members 72 are rotatably mounted on a second carrier 74 such that each planet gear 72 meshingly engages both the outer gear member 68 and the inner gear member 70.

In the preferred embodiment of the hybrid transmission 10, the outer gear member 68 of the second planetary gear set 66 is also permanently connected to ground 42. The inner gear member 70 is presented from a second, sun sleeve shaft 76, which preferably circumscribes the output shaft 48, to drive, or be driven by, the second motor/generator 20. An annular, second carrier extension sleeve 78 is secured to the second carrier 74 for selective connection to the output shaft 48 and selective connection to the annular regenerative sleeve shaft 50 that circumscribes the output shaft 48.

The selective connection between the second carder extension sleeve 78 and the annular regenerative sleeve shaft 50 is accomplished by a third torque transfer device 80 which also operates as a clutch by which to connect the second carrier extension sleeve shaft 78 to a third transfer arm 82 that projects radially outwardly from the annular sleeve shaft 50. The selective connection between the second carrier extension sleeve 78 and the output shaft 48 is accomplished by a fourth torque transfer device 84 which operates as a clutch by which to connect the second carrier extension sleeve 78 to a fourth transfer arm 86 that projects radially outwardly from the output shaft 48. The second motor/generator 20 rotates, or is rotated by, the inner gear member 70 of the second planetary gear set 20 through the connection effected by the second sun sleeve shaft 76. Like the first motor/generator 18, the second motor/generator 20 is also capable of transforming electrical power into mechanical power and transforming mechanical power into electrical power.

When the second motor/generator 20 is acting as a motor, power will be transmitted from the second motor/generator 20 through the second sun sleeve shaft 76 to rotate the inner gear member 70 of the second planetary gear set 66 and thereby effect rotation of the carrier 74. Conversely, power applied to the inner gear member 70, as will be hereinafter more fully descried, is transmitted through the second sun sleeve shaft 76, which circumscribes the output shaft 48, to the second motor/generator 20 so that it might serve as a generator. In either situation, the grounded outer gear member 68 serves as the reaction member for the second planetary gear set 66.

The second motor/generator 20 is also selectively connected directly to the output shaft 48 through a fifth torque transfer device 88. As depicted, a radially outwardly displaced, sleeve extension 90 may also be presented from the second sun sleeve shaft 76 for selective connection to the output shaft 48. The selective connection between the sleeve extension 90 and the output shaft 48 is accomplished by the fifth torque transfer device 88, which also operates as a clutch by which to connect the sleeve extension 90 to a fifth transfer arm 92 that projects radially outwardly from the output shaft 48.

The transmission output shaft 48 drives the axles 26 and 28 through a differential 94. When the hybrid transmission 10 is used in a land vehicle, each axle 26 and 28 may terminate in a respective wheel, or propelling, member 96 and 98.

Operation of the exemplary preferred embodiment

Introduction

The operator of the vehicle has three primary devices to control the transmission 10. One of the primary control devices is a well known drive range selector (not shown) that causes the transmission 10 to operate in the park, neutral, reverse or forward drive ranges. The second and third primary control devices constitute an accelerator pedal (not shown) and a brake pedal (also not shown). The information obtained from these three primary control sources will hereinafter be referred to as the "operator demand", and a well known, on-board control device, generally in the nature of a computer, receives the "operator demand" and then manipulates the components of the transmission 10 appropriately in response thereto.

In the present invention, there are three prime mover modes—viz.: (1) that mode wherein the engine 12 serves as the prime mover; (2) that mode wherein the engine 12 operates in combination with the mechanical energy storage device 14 to serve as a combined prime mover; and, (3) that mode wherein a source of electrical energy serves as the prime mover. Although the following explanation shall focus on the operation of the transmission 10 in response to each of the three prime mover modes, it will also become apparent that one may switch between the prime mover modes during operation of the vehicle.

Before turning to a detailed explanation as to the operation of the transmission in response to each of the prime mover modes, it may be helpful to appreciate that all three prime mover modes operate in substantially the same manner to provide the first forward drive range as well as in the reverse drive range.

Engine Prime Mover Mode

If the operator selects the reverse drive range while operating the transmission 10 with the engine 12 serving as the sole prime mover, the fourth torque transfer device 84 is engaged, but all other torque transfer devices remain disengaged. The engine 12 directly rotates the first carrier 40 to drive the planet gear members 38 against the grounded outer gear member 34 and thereby rotate the inner gear member 36. Such rotation of the inner gear member 36 by operation of engine 12 drives the first motor/generator 18 through the connection of the inner gear member 36 with the first sun sleeve shaft 44, and the first motor/generator 18 is thereby operated as a generator. In this drive range, the ECU 22 transmits electrical energy from the first motor/generator 18 to the second motor/generator 20 so that the latter will operate as a motor. The ECU 22 also assures that the second motor/generator 20 will rotate in an appropriate direction so that as the inner gear member 70 drives the planet gear members 72 against the grounded outer gear member 68, rotation of the carder 74—with the fourth torque transfer device 84 engaged—effects operation in the reverse drive range.

If the operator selects the forward drive range while operating the transmission 10 with the engine 12 serving as the sole prime mover, the fourth torque transfer device 84 is also engaged, and all other torque transfer devices remain disengaged. Here, too, the engine 12 directly drives the first carrier 40 to effect rotation of the inner gear member 38 against the reaction provided by the grounded outer gear member 34. As such, the first motor/generator 18 also operates as a generator. With the forward drive range having been selected by the operator, the ECU 22 transmits electrical energy from the first motor/generator 18 to the second motor/generator 20 so that the latter will operate as a motor. The ECU 22 assures that the second motor/generator 20 will rotate in an appropriate direction so that as the inner gear member 70 of the second planetary gear set 66 drives the planet gear members 72 against the grounded outer gear member 68, rotation of the carrier 74—with the fourth torque transfer device 84 engaged—effects operation in the first forward drive range.

As the motor/generator 20 approaches its maximum speed rating, the on-board computer will cause the transmission 10 to shift into the second forward drive range. This is accomplished by disengaging the fourth torque transfer device 84 and engaging the first torque transfer device 52. Engagement of the first torque transfer device 52 connects the carrier 40 directly to the output shaft 48. Hence, a direct drive between the engine 12 and the output shaft 48 is effected to drive the vehicle.

As the engine approaches the maximum speed rating (for example, approximately 2400 RPM) the on-board computer will cause the transmission 10 to shift to the third forward drive range. This is accomplished by disengaging the first torque transfer device 52 and engaging the fifth torque transfer device 88. As such, the engine 12 drives the first motor/generator 18, as in the first forward drive range, to power the second motor/generator 20 as a motor. With the fifth torque transfer device 88 engaged, the second motor/generator 20 will drive the output shaft 48 up to the maximum speed rating of the motor/generator 20 (for example, approximately 3272 RPM). Thus, an overdrive is effected.

Engine and Mechanical Energy Storing Device—Combined Prime Mover Mode

To operate the transmission 10 in the combined prime mover mode identified as employing the engine 12 in combination with the mechanical energy storing device 14 (hereinafter, simply the flywheel 14) the first torque transfer device 56 may be engaged at engine start-up so that the flywheel 14 may be brought up to its maximum speed—even before the desired drive range is selected.

Specifically, with the input shaft 30 being connected directly between the engine 12 and the carrier 40, when the second torque transfer device 56 is engaged the first carrier extension 46 is operatively connected to the second transfer arm 58 such that the second annular sleeve shaft 50 rotates with the carrier extension 46. Rotation of the second annular sleeve shaft 50 effects a concomitant rotation of the first bevel gear 60 secured thereto. Rotation of the first bevel gear 60, in turn, rotates the second bevel gear 62 that is meshingly engaged with the first bevel gear 60 in order to rotate the flywheel 14 such that it stores mechanical energy.

If the operator selects the reverse drive range while operating the transmission 10 with the engine 12 working in combination with the mechanical energy storage device 14 to serve as combined prime movers, the fourth torque transfer device 84 is also engaged, but all torque transfer devices other than the first and the fourth remain disengaged.

Rotation of the first carrier 40 by the engine 12, as well as by the momentum of the flywheel 14, drives the planet gear members 38 against the grounded outer gear member 34 to rotate the inner gear member 36 of the first planetary gear set 32 to drive the first motor/generator 18, through its connection with the first sun sleeve shaft 44, as a generator. With the reverse drive range having been selected by the operator, the ECU 22 transmits electrical energy from the first motor/generator 18 to the second motor/generator 20 so that the latter will operate as a motor. Here, too, the ECU 22 assures that the second motor/generator 20 will rotate in an appropriate direction so that as the inner gear member 70 drives the planet gear members 72 against the grounded outer gear member 68, rotation of the carrier 74—with the fourth torque transfer device 84 engaged—effects operation in the reverse drive range.

It should be appreciated that the amount of power supplied from the engine 12 depends upon how much fuel is fed thereto. Basically, most of the power may be supplied by the flywheel 14.

If the operator selects the first forward drive range while operating the transmission 10 with the engine 12 working in combination with the mechanical energy storage device 14 to serve as combined prime movers, the fourth torque transfer device 84 is also engaged, but all torque transfer devices other than the first and the fourth remain disengaged. Here, too, the engine 12, in combination with the flywheel 14, directly drives the first carrier 40 to effect rotation of the inner gear member 38 against the reaction provided by the grounded outer gear member 34. As such, the first motor/generator 18 also operates as a generator. With the forward drive range having been selected by the operator, the ECU 22 transmits electrical energy from the first motor/generator 18 to the second motor/generator 20 so that the latter will operate as a motor. The ECU 22 assures that the second motor/generator 20 will rotate in an appropriate direction so that as the inner gear member 70 of the second planetary gear set 66 drives the planet gear members 72 against the grounded outer gear member 68, rotation of the carrier 74—with the fourth torque transfer device 84 engaged -- effects operation in the first forward drive range. Here, too, the amount of power supplied from the engine 12 depends upon how much fuel is being fed thereto. Basically, most of the power may be supplied by the flywheel 14.

As the motor/generator 20 approaches its maximum speed rating, the on-board computer will cause the transmission 10 to shift into the second forward drive range. This is accomplished by disengaging the second and fourth torque transfer devices 56 and 84, respectively, and engaging the first and third torque transfer devices 52 and 80, respectively. As such, the carrier 40 is directly connected to the output shaft 48 through the first torque transfer device 52, and the flywheel 14 is operatively connected to the carrier 74 of the second planetary gear set 66.

Engagement of the first torque transfer device 52 effects a direct connection between the input shaft 30 and the output shaft 48. Thus, the engine power is applied directly to the output shaft 48, with the power applied by the engine 12 being dependent on the fuel being fed to the engine. Engagement of the third torque transfer device 80 allows the momentum of the flywheel 14 to rotate the carrier 74 of the second planetary gear set 66, with the result that the planet gear members 72 drive the inner gear member 70 against the reaction supplied by the grounded outer gear member 68. The second sleeve shaft 76 transfers the rotation of the inner gear member 70 to the motor/generator 20 such that motor/generator 20 operates as a generator. The electrical energy thus supplied by the second motor/generator 20 is transmitted through the ECU 22 to power the first motor/generator 18 as a motor. The rotation applied to the inner gear member 36 by the first motor/generator 18 acting as a motor drives the planet gear members 38 against the grounded outer gear member 34 to rotate the first carrier 40 in a direction that supplements the power applied to the output shaft 48 by the engine 12. It is anticipated that during this operational condition the momentum of the flywheel 14 will be depleted so that in time the engine 12 will eventually be required to supply the required power.

As the engine approaches the maximum speed rating (for example, approximately 2400 RPM) the on-board computer will cause the transmission 10 to shift to the third forward drive range. This is accomplished by disengaging the first torque transfer device 52 and engaging the fifth torque transfer device 88. The third torque transfer device 80 remains engaged, but all other torque transfer devices remain disengaged.

In this operational condition the first motor/generator 18 is driven as a generator by the engine 12, and the ECU 22 trans,nits electrical energy to drive the second motor/generator 20 as a motor. Engagement of the third torque transfer device 84 allows the motor/generator 20 to drive the flywheel 14, and engagement of the fifth torque transfer device 88 effects a direct connection between the second motor/generator 20 and the output shaft 48. As such, rotation of both the flywheel 14 and the output shaft 48 accelerate as the speed of the second motor/generator 20 increases. With the fifth torque transfer device 88 engaged, the second motor/generator 20 will drive the output shaft 48 up to the maximum speed rating of the motor/generator 20 (for example, approximately 3272 RPM). Thus, an overdrive is effected.

It should be noted that all shifting operations should be done at synchronous speeds when the flywheel 14 is driving inasmuch as both the vehicle and the flywheel are capable of, and do, generate high inertias. It is also important to recognize that in comparison to electric storage means such as batteries, a flywheel 14 is more weight and space effective. In addition, batteries are not capable of recharging quickly, whereas a flywheel can receive and store mechanical energy rapidly. This quality is particularly desirable during braking, for example, when the vehicular momentum generates power that can be absorbed by a flywheel with extreme rapidity.

Electrical Energy as the Prime Mover Mode

If the operator selects the reverse drive range while operating the transmission 10 with the source of electrical energy 16 (either on-board or out-board of the vehicle) serving as the sole prime mover, the fourth torque transfer device 84 is engaged, but all other torque transfer devices are disengaged. The engine 12 directly rotates the first carder 40 to drive the planet gear members 38 against the grounded outer gear member 34 and thereby rotate the inner gear member 36. Such rotation of the inner gear member 36 by operation of engine 12 drives the first motor/generator 18 through the connection of the inner gear member 36 with the first sun sleeve shaft 44, and the first motor/generator 18 is thereby operated as a generator. In this drive range, the ECU 22 transmits electrical energy from the first motor/generator 18 to the second motor/generator 20 so that the latter will operate as a motor. The ECU 22 also assures that the second motor/generator 20 will rotate in an appropriate direction so that as the inner gear member 70 drives the planet gear members 72 against the grounded outer gear member 68, rotation of the carrier 74 - with the fourth torque transfer device 84 engaged—effects operation in the reverse drive range. If the operator selects the forward drive range while operating the transmission 10 with the source of electrical energy 16 serving as the sole prime mover, the fourth torque transfer device 84 is also engaged, and all other torque transfer devices are disengaged.

As the carrier 74 approaches its maximum speed rating (for example, 1800 RPM) the on-board computer will cause the transmission 10 to shift into the second forward drive range. This is accomplished by disengaging the fourth torque transfer device 84 and engaging the fifth torque transfer device 88. Engagement of the fifth torque transfer device 88 effects a direct connection between the second motor/generator 20 and the output shaft 48. As such, rotation of the output shaft 48 accelerate as the speed of the second motor/generator 20 increases. With the fifth torque transfer device 88 engaged, the second motor/generator 20 will drive the output shaft 48 up to the maximum speed rating of the transmission (for example, approximately 3272 RPM).

While only a preferred embodiment of my present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a regenerative transmission 10 embodying the concepts of the present invention is capable of accepting multiple power inputs, but also accomplishes the other objects of the invention.

I claim:

1. A transmission comprising:

an input shaft;

a first motor/generator;

a first planetary gear set;

said first planetary gear set having first and second gear means meshingly engaged by third gear means;

one of said gear means being grounded;

another of said gear means being connected to said first motor/generator;

said input shaft being operatively connected to said third gear means;

a second motor/generator;

means electrically to connect said first and second motor/generators;

an output shaft; and, said second motor/generator operatively connected to said output shaft.

2. A transmission, as set forth in claim 1, further comprising:

mechanical energy storing means;

means selectively to rotate said mechanical energy storage means:

gear means selectively to effect a connection between said mechanical energy storing means and said input shaft.

3. A transmission, as set forth in claim 1, further comprising:
a first torque transfer means selectively to effect an operative connection between said input shaft and said output shaft.

4. A transmission, as set forth in claim 3, further comprising:
a mechanical energy storing means;
a first gear connected to said mechanical energy storing means to rotate in unison therewith;
a second gear operatively, and selectively, connected to said input shaft;
said second gear meshingly engaging said first gear.

5. A transmission, as set forth in claim 1, further comprising:
a second planetary gear set;
said second planetary gear set having first and second gear means meshingly engaged by third gear means;
one of said gear means of said second planetary gear set being grounded;
another of said gear means of said second planetary gear set being connected to said second motor/generator and selectively connected to said output shaft;
said third gear means of said second planetary gear set being selectively connected to said output shaft and being operatively connected to said third gear means.

6. A transmission, as set forth in claim 1, further comprising:
one of said gear means being selectively connected to said output shaft.

7. A transmission, as set forth in claim 5, wherein:
third gear means is also selectively connected to said mechanical energy storing means.

8. A transmission, as set forth in claim 7, further comprising:
a first torque transfer means selectively to effect an operative connection between said input shaft and said output shaft.

9. A transmission, as set forth in claim 8, further comprising:
a second torque transfer means selectively to effect an operative connection between said input shaft and said mechanical energy storing means.

10. A transmission, as set forth in claim 9, further comprising:
a third torque transfer means selectively to effect an operative connection between said mechanical energy storing means and said third gear means of said second planetary gear set.

11. A transmission, as set forth in claim 10, further comprising:
a fourth torque transfer means selectively to effect an operative connection between said third gear means of said second planetary gear set and said output shaft.

12. A transmission, as set forth in claim 11, further comprising:
a fifth torque transfer means selectively to effect an operative connection between said second motor/generator and said output shaft.

13. A regenerative transmission having three prime mover input modes, said transmission comprising:
output shaft means;
first and second planetary gear sets;
each planetary gear set having an inner gear means, an outer gear means and a plurality of planet gear means meshingly engaging said inner and outer gear means;
said planet gear means operatively mounted on a carrier in each said planetary gear set;
said outer gear means in each planetary gear set being grounded;
said inner gear means in each planetary gear set being connected to a respective motor/generator;
means selectively to connect said carrier in each said planetary gear set to said output shaft means; and,
a plurality of torque transfer means for selectively connecting the prime mover input modes to said output shaft means.

14. A regenerative transmission, as set forth in claim 13, wherein:
the prime mover modes are selected from the group consisting of an internal combustion engine, an internal combustion engine in combination with a mechanical energy storage means, and a source of electrical energy.

15. A regenerative transmission, as set forth in claim 13, further comprising:
a first torque transfer device selectively connecting said carrier of said first planetary gear set to said output shaft means;
a second torque transfer device selectively connecting said carrier of said first planetary gear set to a mechanical energy storage means;
a third torque transfer device selectively connecting said carrier of said second planetary gear set to said mechanical energy storage means;
a fourth torque transfer device selectively connecting said carrier of said second planetary gear set to said output shaft means; and,
a fifth torque transfer device selectively connecting said inner gear means of said second planetary gear set to said output shaft means.

16. A regenerative transmission, as set forth in claim 15, wherein:
one of prime mover modes is an internal combustion engine; said first, fourth and fifth torque transfer devices are selectively operable to provide a reverse range of operation and three forward ranges of operation.

17. A regenerative transmission, as set forth in claim 16, wherein:
said fourth torque transfer device is selectively applied to provide a reverse and first forward range of operation;
said first torque transfer device is selectively applied to provide a second forward range of operation; and,
said fifth torque transfer device is selectively applied to provide a third forward range of operation.

18. A regenerative transmission, as set forth in claim 17, wherein:
said internal combustion engine provides power to the first of said motor/generators when serving as a generator; and,
means are provided to transfer electrical energy from said first motor/generator to said second motor/generator when serving as a motor.

19. A regenerative transmission, as set forth in claim 15, wherein:
one of said prime mover modes is an internal combustion engine operating in conjunction with said mechanical energy storage means; and,
all of said torque transfer means are selectively operable to provide one reverse and three forward operating ranges.

20. A regenerative transmission, as set forth in claim 19, wherein:

said second and fourth torque transfer devices are selectively engaged to provide a reverse and a first forward range of operation;

said first and third torque transfer devices are selectively engaged to provide a second forward range of operation; and, said third and fifth torque transfer devices are selectively engaged to provide a third forward range of operation.

21. A regenerative transmission, as set forth in claim 18, wherein:

said internal combustion engine and said mechanical energy storage device combine to provide power to said motor/generator serving as a generator;

means are provided to transfer power from said motor/generator serving as a generator to said motor/generator serving as a motor; and, wherein said motor/generator serving as a generator and said motor/generator serving as a motor swap functions depending upon the range of operation.

22. A regenerative transmission, as set forth in claim 15, wherein:

one of said prime mover modes is a source of electrical energy;

said fourth and fifth torque transfer means are selectively operable to provide two operating ranges.

23. A regenerative transmission, as set forth in claim 22, wherein:

said fourth torque transfer device is selectively engaged to provide a reverse and first forward range of operation; and, said fifth torque transfer device is selectively engaged to provide a second range of operation.

24. A regenerative transmission, as set forth in claim 23, wherein:

said source of electrical energy is an overhead wire.

25. A regenerative transmission, as set forth in claim 23, wherein: said source of electrical energy is an underground rail.

26. A regenerative transmission, as set forth in claim 23, wherein: said source of electrical energy is one or more batteries.

* * * * *